United States Patent [19]

Carnell

[11] Patent Number: 5,340,554
[45] Date of Patent: Aug. 23, 1994

[54] NOX REMOVAL PROCESS

[75] Inventor: Peter J. H. Carnell, Stockton on Tees, Great Britain

[73] Assignee: Imperial Chemical Indutries PLC, London, England

[21] Appl. No.: 65,391

[22] Filed: May 21, 1993

[30] Foreign Application Priority Data

May 22, 1992 [GB] United Kingdom ............ 9210926.3
Nov. 25, 1992 [GB] United Kingdom ............ 9224659.4

[51] Int. Cl.$^5$ ............................................ C01B 21/20
[52] U.S. Cl. ............................ 423/235; 423/236; 423/239.1; 208/254 R; 502/56; 585/810
[58] Field of Search .............. 423/239, 243.3, 235, 423/236; 502/56; 208/254 R, 255; 585/810

[56] References Cited

U.S. PATENT DOCUMENTS

| 4,029,738 | 6/1977 | Courty et al. | 423/213.2 |
| 4,259,303 | 3/1981 | Nakaji et al. | 423/239 |
| 4,320,100 | 3/1982 | Engelbrecht et al. | 423/219 |
| 4,828,806 | 5/1989 | Flockenhaus et al. | 423/213.5 |
| 5,037,538 | 8/1991 | Chin et al. | 208/113 |

FOREIGN PATENT DOCUMENTS 217045 4/1987 European Pat. Off. .

*Primary Examiner*—Gary P. Straub
*Assistant Examiner*—Timothy C. Vanoy
*Attorney, Agent, or Firm*—Cushman, Darby & Cushman

[57] ABSTRACT

A refinery catalyst is regenerated by burning off coke in an air stream to give an off-gas: before cryogenic recovery of hydrocarbons from the off-gas, nitrogen oxides (NOx) are removed from the off-gas by contact with a hydrogenation catalyst.

4 Claims, No Drawings

NOX REMOVAL PROCESS

This invention relates to a process for the removal of oxides of nitrogen from gases such as refinery off-gases.

Conventionally, high molecular weight hydrocarbons are converted to lower molecular weight hydrocarbons in a cracking unit, e.g. a fluid catalytic cracking unit (FCC). Such units frequently employ catalysts, e.g. precious metal doped zeolites. In use, the catalysts accumulate carbonaceous deposits, known as coke, which diminish the activity of the catalyst. In order to maintain a satisfactory catalytic performance the coke is required to be burnt off, thereby restoring the activity of the catalyst. Conventionally, the coke is burnt off to produce a gaseous off-gas stream comprising hydrogen, combustion products, and residual hydrocarbons.

The off-gas can be, and often is, used as a fuel, but since it generally contains a considerable proportion of valuable hydrocarbons, such as olefins, recovery of those hydrocarbons would be economically attractive. For example a typical FCC unit produces about 30 te/h of off-gas containing about 20% by volume of olefins and about 45% by volume of other hydrocarbons. It is possible to separate the hydrocarbons cryogenically, using a cold-box, but this has been found to lead to an explosion hazard. This hazard arises (see a paper by Kohler entitled "Cold box explosion at Shell steam cracker in Berre, France" presented at the AIChE Spring National Meeting, Houston Texas Apr. 7–11, 1991) as a result of the formation of unstable organic nitro or nitroso compounds by reaction of nitrogen oxides, such as nitric oxide, nitrogen dioxide, and dinitrogen trioxide, at low temperatures with unsaturated hydrocarbons, particularly mono-olefins, and dienes such as butadiene and propadiene, and acetylenes in the cold box. These organic nitro or nitroso compounds are collectively termed NOx gums. Particularly unstable NOx gums result from conjugated dienes such as 1,3 butadiene and cyclopentadiene and may ignite or even explode at low temperatures.

The presence of nitrogen oxides in the off-gas from FCC and other processes wherein oxidative regeneration is employed is inevitable as a result of reaction of nitrogen in the air used for regeneration, and nitrogen compounds in the coke deposit on the catalyst, with oxygen in the air used for regeneration. It is therefore desirable to remove the nitrogen oxides from the off-gas before the latter is fed to the cold-box. Removal of nitrogen dioxide can be effected by treatment with diethanolamine (DEA) and caustic. However such treatment is not particularly effective at removing nitric oxide: since the off-gas usually also contains a small amount of oxygen resulting from the air employed for regeneration, residual nitrogen oxide can later combine with that oxygen to form further nitrogen dioxide and even dinitrogen trioxide within the cold-box. In addition to giving rise to an explosion hazard, the presence of nitrogen dioxide and dinitrogen trioxide in the cold box can give rise to plugging. It is thus desirable to devise a process whereby the nitrogen oxides, particularly nitric oxide, content of the off-gas can be decreased to an acceptable level.

It is known from U.S. Pat. No. 4,320,100 that nitrogen oxides can be catalytically hydrogenated using catalysts such as sulphided cobalt or nickel molybdate. We have now found that such catalysts are effective in decreasing the nitrogen oxides content of regeneration off-gases without effecting any significant hydrogenation of the olefins present in those gases.

Accordingly the present invention provides a process for the recovery of hydrocarbons comprising subjecting a refinery cracking catalyst on which is deposited a nitrogen compound containing carbonaceous deposit to a combustion reaction with air thereby reducing the amount of the deposit on the catalyst and forming an off-gas stream containing, in addition to carbon combustion products, also hydrogen, hydrocarbons, including olefins, and oxides of nitrogen (NOx), and thereafter passing at least part of the off-gas stream over a hydrogenation catalyst under conditions effective to reduce nitrogen oxides without effecting substantial hydrogenation of the olefins in said off-gas stream, thereby producing a NOx depleted stream, and thereafter recovering hydrocarbons from said NOx depleted stream cryogenically.

It will be appreciated that it is generally unimportant whether the catalyst effects hydrogenation of hydrocarbons that are more unsaturated than olefins: thus if dienes or acetylenes are present in the off-gas, any hydrogenation thereof to olefins adds to the amount of olefins that can be recovered. Hence while the conditions should be such as to minimise hydrogenation of olefins, it is not necessary that the conditions are also such as to minimise hydrogenation of hydrocarbons that are more unsaturated than mono-olefins.

Typical catalysts which are able to perform the reduction of the oxides of nitrogen are the cobalt and nickel molybdate catalysts used for the hydrogenolysis of sulphur compounds in certain feedstock purification reactions and the iron and chromium based catalysts employed in high temperature shift reactions. Because these catalysts are normally efficient hydrogenation catalysts it is preferred that the sulphided forms of the catalysts are used to minimise the hydrogenation of the olefins present in the off-gas stream.

A typical sulphur compound hydrogenolysis catalyst in a non-sulphided form has the following typical composition, with the composition expressed as weight % of the respective oxide on a loss free basis

| cobalt or nickel oxide (CoO or NiO) | 4.0% |
| molybdenum oxide ($MoO_3$) | 12.0% |
| silica ($SiO_2$) | 1.0% |
| alumina ($Al_2O_3$) | balance |

Such catalysts typically have a bulk density of about 600 kg/m$^3$, a surface area of 220 m$^2$/g and a pore volume of about 0.6 cm$^3$/g.

A high temperature shift catalyst, again in a non-sulphided form, has the following typical range of compositions, with the composition expressed as weight % of the respective oxide on a loss free basis

| iron oxide ($Fe_2O_3$) | 85–90% |
| chromium oxide ($Cr_2O_3$) | balance |

Such catalysts typically have a bulk density of about 1000–1250 kg/m$^3$, a surface area of 60–120 m2/g and a pore volume of 0.2–0.35 cm$^3$/g.

Sulphiding of such catalysts may be effected by contact with a suitable sulphur containing compound such as hydrogen sulphide, carbon disulphide, or an organic sulphide, such as dimethyl disulphide or butyl mercaptan, that is easily decomposed by heating.

Preferably the reaction temperature at which the off-gas stream contacts the catalyst is at or below 250° C. in order to limit the undesirable hydrogenation of residual olefins. Preferred temperatures are in the range 120°–190° C. The pressure is preferably in the range 1 to 30 bar abs.

The reaction is preferably effected using a fixed bed of catalyst with a contact time of 1 to 10 s.

The catalytic NOx removal stage may be used in association with a conventional NOx removal process, e.g. the aforementioned DEA and caustic system, or may be suitably sized to be used alone.

The invention is illustrated by the following example. A stainless steel reactor was charged with 2 liters of a cobalt molybdate catalyst of the type described above that had been sulphided to a sulphur content of 5% by weight by contact with hydrogen sulphide. Off-gas from a cracker was fed to the reactor at a rate of 24.4 Nm$^3$/h at a pressure of about 11.3 bar abs. and at temperatures ranging from 150° C. to 190° C. for a period of 63 days. The off-gas comprised primarily C1–C4 hydrocarbons and hydrogen with minor amounts of nitrogen, carbon oxides, and small amounts of nitrogen oxides, primarily nitric oxide. During the course of the trial the hydrogen content varied between about 24–32%, the total of saturated C1 to C4 hydrocarbons between about 40–44%, and the C2–C4 olefins between about 18–22% (percentages by volume).

The experiment was commenced with a pressure of about 11 bar abs. and a temperature of 149° C. This gave little decomposition of nitric oxide and so the temperature was subsequently increased and maintained in the range of about 160°–170° C. When it had been established that essentially no hydrogenation of the olefins was occurring, the temperature was further increased and maintained in the range of about 180°–190° C. The pressure was then decreased to about 8 bar abs. and the trial continued at inlet temperatures in the range 170°–190° C. After about 58 days the activity of the catalyst for NOx removal declined. The results are shown in the following table, where the nitrogen oxides contents are quoted in parts per billion by volume.

TABLE

| Time (days) | T (°C.) | P (bar abs) | NO (ppb) in | NO (ppb) out | NO$_2$ (ppb) in | NO$_2$ (ppb) out | olefin (mol %) in | olefin (mol %) out |
|---|---|---|---|---|---|---|---|---|
| 2 | 149 | 11 | 45 | 45 | 32 | 14 | | |
| 7 | 162 | 11 | 31 | 15 | 6 | 3 | 19.1 | 19.1 |
| 9 | 163 | 11 | 16 | 3 | 0 | 5 | | |
| 14 | 169 | 11 | 73 | 8 | 12 | 14 | 21.0 | 21.2 |
| 21 | 185 | 11 | 9 | 9 | 7 | 5 | | |
| 23 | 191 | 11 | 12 | 10 | 2 | 1 | 21.1 | 21.0 |
| 28 | 186 | 11 | 11 | 10 | 5 | 2 | | |
| 30 | 181 | 11 | 10 | 9 | 5 | 2 | | |
| 35 | 183 | 8 | 12 | 11 | 6 | 5 | | |
| 37 | 186 | 8 | 10 | 11 | 7 | 5 | | |
| 44 | 182 | 8 | 12 | 4 | 1 | 1 | | |
| 49 | 181 | 8 | 8 | 10 | 2 | 1 | | |
| 51 | 178 | 8 | 8 | 5 | 1 | 1 | | |
| 58 | 189 | 8 | 53 | 39 | 35 | 31 | | |
| 63 | 171 | 8 | 36 | 38 | 13 | 16 | | |

We claim:

1. A process for the recovery of hydrocarbons comprising subjecting a refinery cracking catalyst on which is deposited a nitrogen compound containing carbonaceous deposit to a combustion reaction with air thereby reducing the amount of the deposit on the catalyst and forming an off-gas stream containing, in addition to carbon combustion products, also hydrogen, hydrocarbons, including olefins, and oxides of nitrogen (NOx), and thereafter passing at least part of the off-gas stream over a hydrogenation catalyst under conditions effective to reduce nitrogen oxides without effecting substantial hydrogenation of the olefins in said off-gas stream, thereby producing a NOx depleted stream, and thereafter recovering hydrocarbons from said NOx depleted stream cryogenically.

2. A process according to claim 1 wherein the hydrogenation is effected using a sulphided nickel or cobalt molybdate, or iron oxide/chromium oxide, as catalyst.

3. A process according to claim 1 wherein the hydrogenation is effected at a temperature below 250° C.

4. A process according to claim 3 wherein the hydrogenation is effected at a temperature in the range 120°–190° C.

* * * * *